Nov. 11, 1952 P. NICOLAS 2,617,939
SYNCHRONIZATION INDICATOR FOR COMMON WAVE TRANSMITTING SYSTEMS
Filed Aug. 9, 1946
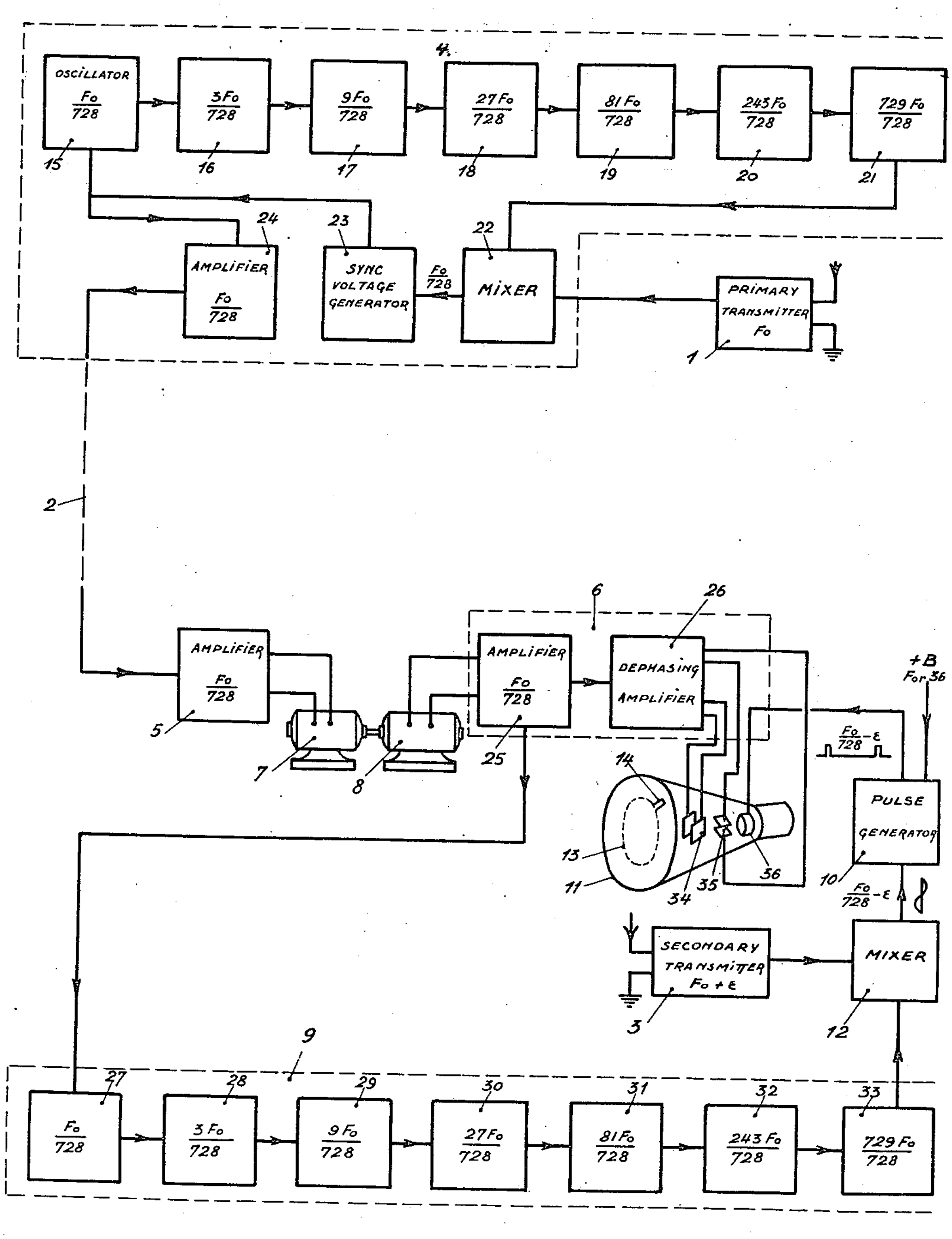
INVENTOR
PAUL NICOLAS
BY Hazeltine, Lake & Co
AGENTS Patented Nov. 11, 1952

2,617,939

UNITED STATES PATENT OFFICE 2,617,939

SYNCHRONIZATION INDICATOR FOR COMMON WAVE TRANSMITTING SYSTEMS

Paul Nicolas, Paris, France, assignor to Societe Francaise Radio Electrique, a corporation of France Application August 9, 1946, Serial No. 689,470
In France November 4, 1939

Section 1, Public Law 690, August 8, 1946
Patent expires November 4, 1959

6 Claims. (Cl. 250—39)

The present invention has for its object a method of measuring and an apparatus enabling the synchronism of two high frequency transmitters to be checked or small differences of frequency between these two transmitters to be detected.

To this end, use is made of a cathode ray oscillograph, or of any like indicating device, to which are applied voltages respectively produced by each of two transmitters, or produced by their mixing, in order to obtain on the screen of the oscillograph an image which is stationary when the two transmitters are exactly in synchronism whereas such image will rotate in one direction or the other if the frequency of one becomes lower or higher than that of the other.

The invention has more particularly for its object the checking of the synchronism of a broadcasting transmitter relatively to a master transmitter which is as stable as possible and is considered to be invariable and which acts as a pilot or drive for a whole system, for instance.

In such installations, it is convenient to use simple telephone lines for transmitting the checking frequency of the master station to the stations to be checked. However, as such lines are not suitable for transmitting high frequency currents, this will involve the provision of two changes of frequency. One decreases the frequency of the carrier wave of the master station ($10^6$ cycles for instance) to a normal telephone frequency (of the order of 1,000 to 1,500 cycles for instance), the other increasing this audio-frequency at the receiving end of the line, to a value which can readily be compared with the frequency of the carrier wave of the transmitter to be checked.

To enable a clear understanding of the invention one embodiment thereof is described by way of example but without limitation on the scope of the invention, and this is illustrated in the accompanying drawings of which the single figure shows schematically such embodiment. In this figure, 1 denotes the master station, the wavelength of which corresponds for instance to a frequency $F_0$=959,000 cycles/second. 2 is the telephone line which connects the pilot station to a station 3 to be checked, 4 is a frequency divider, the manner of construction of which will be explained hereinafter, with a ratio of 1/728 for instance, which converts the frequency $F_0$=959,000 of the pilot station to a frequency $$f_0=\frac{F_0}{728}=1317.3$$

Such a frequency can easily be transmitted by the line.

The frequency $$\frac{F_0}{728}$$

is obtained by means of a demultiplier 4 constituted as follows: at 15 there is represented an oscillator tuned to a frequency very close to 1317.3 cycles, and the frequency thus provided is subjected to six successive treblings in the frequency multiplier stages 16–21.

At the output of stage 21 there is then obtained the 729th harmonic of the oscillator frequency, that is to say, a frequency of 960.3173 kilocycles. There is easily obtained through a well known operation of synchronism, the entrainment of the oscillator in such a way that it operates exactly at the frequency $$\frac{F_0}{728}$$

Once the entrainment is effected, the amplification in the stage 24 and the transmission to the line 2 of the voltage derived from the oscillator 15 take place as in known systems.

The number of multiplication 729 which is indicated in the example given has been chosen as being particularly easy to obtain by 6 successive treblings, since $729=3^6$. The coefficient of demultiplication 728 deduced therefrom by the subtraction of unity is equally easy to realize by change of frequency, as has been explained.

At the incoming end of line 2 in the secondary station the current of telephonic frequency $$\frac{F_0}{728}$$

passes at first into amplifying apparatus 5 and 6 and the included stabilizing apparatus 7 and 8.

These stabilizers are inserted in the amplification cascade 5 and 6 to afford protection to the apparatus associated with a secondary station from small disturbances arriving over the line.

The amplifier 5 passes current of the frequency 1317.3 cycles at a level necessary to entrain a synchronized motor 7 whose speed of rotation is an exact submultiple of that frequency. To the same motor shaft there is directly connected an alternator 8 which reproduces a voltage having a frequency of 1317.3 cycles and in turn energizes the input of amplifier 6. In this manner the circuits controlled by this amplifier are rendered electrically independent of line 2.

The current stabilized and suitably amplified in stage 25 is passed through frequency multiplier 9 whose step-up ratio, according to the invention, differs by unity from the coefficient of demultiplication of the system 4 located at the input of line 2. This ratio in the example chosen will then have the value 729 and will be realized by 6 successive treblings in the stages 28 to 33 fed by input stage 27.

In the example chosen the voltage assigned to the output of stage 33 will then have a frequency equal to 960.3173 kilocycles.

It is this last mentioned voltage which is superimposed in the mixer 12 with the voltage of frequency very close to 959 kilocycles, say a frequency $F_0+\epsilon$ ($\epsilon$ being a number very small, actually of the order of a few hundredths of a cycle) provided by the master oscillator of this secondary transmitter 3.

It is clear that the superimposition of the two voltages will provide a beat whose frequency will be $$\frac{F_0}{728}=\epsilon$$

cycles. It is this last mentioned frequency which is to be compared with the frequency $$\frac{F_0}{728}$$

supplied to the amplifier 6. In order to determine $\epsilon$ exactly and, if need be, to correct the frequency of the secondary transmitter if it is out of synchronism.

To this end the amplifier 6 comprises a dephasing stage 26 which provides at its output two voltages in quadrature which are respectively applied to the two pairs of deflection plates 34 and 36 of a cathode ray tube 11. It is well understood that in the absence of any other modulation these voltages cause the ray of the tube to describe on the screen a circumference 13 at a speed of rotation $$\frac{F_0}{728}$$

The diameter of this circumference depends on the dimensions of the tube and the voltages which are applied to other electrodes, particularly the anode.

On the other hand the combined frequency $$\frac{F_0}{728}=\epsilon$$

at the output of mixer 12 is impressed on an impulse generator 10 comprising for example a gaseous discharge tube or any other apparatus capable of producing short impulses at a frequency of $$\frac{F_0}{728}$$

and these impulses are inserted into an anode feed circuit of oscillograph 11, in series with the normal direct B+ voltage of anode feed 36.

As a result of the momentary increased voltage fed to said anode, there is an instantaneous increase in the diameter of the luminous circle seen on the screen. If the impulse is of short duration, only a small line or a small radial tooth 14 appears on said luminous circle.

It can moreover be seen that if the difference is nil ($\epsilon=0$) said impulse which in that case is synchronous with the rotation of the spot (same frequency $f_0$) will always occur at the same point on the circle. If, on the contrary, the transmitter to be checked begins to wander in one direction or in the other ($\epsilon>0$ or $<0$) the observer will see the tooth 14 begin to rotate with the speed of rotation $\epsilon$ in one direction or in the other.

The operator will therefore know in which direction he should act on the tuning of the transmitter in order to bring it into synchronism and he will follow the result of his intervention on the oscillograph itself. This operation can be carried out as known by means of any device for correcting the tuning of the transmitter, for instance by means of a small condenser with a slow motion control.

In order to synchronise several broadcasting stations with a director or master station, it is only necessary, according to the invention, to equip the master station with the frequency dividing device 4 and to convey, by means of simple telephone lines, to the various stations to be synchronised, the current at reduced frequency supplied by said device.

In each of the stations controlled, there will be fitted a unit for amplification, stabilisation, frequency multiplication and mixing, and an oscillograph 11, as at the single station 3 illustrated in the drawing.

According to the indications of this apparatus, the operator of each station controlled adjusts the tuning of the transmitter (preferably stabilising by quartz) thereby obtaining the exact synchronism of the whole system.

I claim:

1. In a system of radio transmission on a common wave comprising a primary transmitter and at least one secondary transmitter, means for indicating the difference in frequency between the primary and secondary transmitter comprising a cathode ray tube, means causing the ray of said tube to describe a circle on the screen at a frequency representative of the wave of the primary transmitter, means mixing the frequencies of said primary and secondary transmitters, means superimposing the difference between said mixed frequencies upon said frequency representative of the wave of the primary transmitter to produce a resultant frequency, and means applying that resultant frequency to an electrode of said cathode ray tube whereby there is produced on the screen a luminous spot which is displaced around said circle at a speed which is a function of said difference.

2. In a system of radio transmission on a common wave comprising a primary transmitter and at least one secondary transmitter, means for deriving from the frequency of the primary transmitter a representative frequency obtained by dividing the frequency of said transmitter by a coefficient of demultiplication, means for transmitting said representative frequency toward the secondary transmitter, means for applying said representative frequency to a cathode ray tube in such a manner as to cause the ray thereof to describe a circle on the screen of the tube, means for remultiplying the representative frequency by a coefficient differing by unity from said coefficient of demultiplication, means for superimposing the remultiplied frequency and the frequency of the secondary transmitter and for thus obtaining a resultant frequency and means for applying said resultant frequency to an electrode of said cathode ray tube, whereby there is produced on the screen a luminous spot whose position on said circle depends on the difference between the primary and secondary frequencies.

3. In a system of radio transmission on a common wave comprising a primary transmitter and at least one secondary transmitter, means for deriving from the frequency of the primary transmitter a representative frequency obtained by dividing the frequency of that transmitter by a coefficient of demultiplication, means for transmitting said representative frequency toward the secondary transmitter, means for impressing said representative frequency on a cathode ray tube so that the ray of the tube describes a circumference on the screen thereof, means for remultiplying the representative frequency by a coefficient differing by unity from said coefficient of demultiplication, means for superimposing the remultiplied frequency and the frequency of the secondary transmitter to obtain a result frequency, means for producing impulses whose repetition frequency is equal to said resultant frequency, and means for impressing these impulses on an electrode of said cathode ray tube, whereby there is reproduced on the screen a luminous spot whose position on said circumference depends on the difference between the primary and secondary frequencies.

4. In a system of radio transmission on a common wave comprising a primary transmitter and at least one secondary transmitter, means for deriving from the frequency of the primary transmitter a representative frequency obtained by dividing the frequency of that transmitter by a coefficient of demultiplication, means for transmitting said representative frequency toward the secondary transmitter, means for impressing said representative frequency on a cathode ray tube so that the ray of said tube describes a circumference on the screen thereof, means for remultiplying the representative frequency by a coefficient differing by unity from said coefficient of demultiplication, means for superimposing the remultiplied frequency and the frequency of a second transmitter to obtain a resultant frequency, means for producing impulses whose repetition frequency is equal to said resultant frequency, and means for applying those impulses to an anode of said tube, whereby there is produced on the screen a radial luminous tooth whose position on said circumference depends on the difference between the primary and secondary frequencies.

5. In a system of radio transmission on a common wave comprising a primary transmitter and at least one secondary transmitter; apparatus for indicating the difference in frequency between the primary and secondary transmitters comprising a device for deriving from the frequency of the primary transmitter a representative frequency obtained by dividing the frequency of the transmitter by a coefficient of demultiplication, said device including a local generator tuned to said representative frequency, means for multiplying the frequency of said generator by a coefficient differing by unity from said coefficient of demultiplication, means for superimposing the multiplied frequency of said generator and the frequency of the primary transmitter to obtain an output frequency equal to said representative frequency and means for synchronizing said local generator by said output frequency; means for transmitting the representative frequency toward the secondary transmitter; a cathode ray tube; means situated at the location of the secondary transmitter and controlled by said representative frequency for producing a local frequency equal to said representative frequency, the circuit controlling the last mentioned means being electrically separated from the circuit of said local frequency; means controlled by said local frequency for causing the ray of said tube to describe a circle on the screen thereof at the frequency of said local frequency, means for deriving from said local frequency and the frequency of the secondary transmitter a resultant frequency representing the difference existing between the frequencies of the primary and secondary transmitters, and means for applying that resultant frequency to an electrode of said cathode ray tube whereby there is produced on the screen a luminous spot which is displaced around said circle at a speed which is a function of said difference.

6. In a system of radio transmission on a common wave including a primary transmitter and at least one secondary transmitter; apparatus for indicating the difference in frequency between the primary and secondary transmitters comprising means for transmitting a frequency representative of the frequency of the primary transmitter toward the secondary transmitter, a cathode ray tube situated at the location of the secondary transmitter, means controlled by the representative frequency for causing the ray of said tube to describe a circle on the screen thereof at the frequency of said representative frequency, means controlled by said representative frequency for producing a local frequency at the location of the secondary transmitter which is a function of the frequency of the primary transmitter, means for deriving a resultant frequency by superimposition of the difference existing between the frequency of the secondary transmitter and said local frequency, and means for applying said resultant frequency to an electrode of said cathode ray tube to produce a luminous spot on the screen which is displaced around said circle at a speed which is a function of the difference between the frequencies of the first and second transmitters.

PAUL NICOLAS.

REFERENCES CITED

The following references are of record in the file of this patent:

UNITED STATES PATENTS

| Number | Name | Date |
|---|---|---|
| 1,934,879 | Potter | Nov. 14, 1933 |
| 1,989,770 | Reeves | Feb. 5, 1935 |
| 2,028,880 | Runge | Jan. 28, 1936 |
| 2,130,485 | Feldman et al. | Sept. 20, 1938 |
| 2,189,848 | Wheeler | Feb. 13, 1940 |
| 2,218,636 | Bruckner | Oct. 22, 1940 |
| 2,324,915 | Dow | July 20, 1943 |
| 2,363,941 | Busignies | Nov. 28, 1944 |
| 2,403,626 | Wolf et al. | July 9, 1946 |
| 2,419,601 | Silver | Apr. 29, 1947 |
| 2,422,386 | Anderson | June 17, 1947 |
| 2,436,827 | Richardson et al. | Mar. 2, 1948 |